United States Patent
Mishima et al.

(10) Patent No.: US 7,231,867 B2
(45) Date of Patent: Jun. 19, 2007

(54) ROTARY DAMPER

(75) Inventors: Masaru Mishima, Kani-gun (JP); Nobumichi Hanawa, Kani (JP); Takeshi Wakabayashi, Niiza (JP)

(73) Assignees: Kayaba Industry Co., Ltd., Tokyo (JP); Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/352,064

(22) Filed: Feb. 13, 2006

(65) Prior Publication Data

US 2006/0180416 A1    Aug. 17, 2006

(30) Foreign Application Priority Data

Feb. 16, 2005  (JP) ............................. 2005-038599

(51) Int. Cl.
*F16F 9/14* (2006.01)
*F16D 57/02* (2006.01)

(52) U.S. Cl. ........................................ 92/121; 188/306

(58) Field of Classification Search .................. 92/121, 92/181 R; 188/294, 306; 280/271
See application file for complete search history.

(56) References Cited

U.S. PATENT DOCUMENTS

| 6,824,153 | B2 * | 11/2004 | Hanawa et al. ............. 188/306 |
| 6,848,698 | B2 * | 2/2005 | Hasegawa et al. .......... 280/272 |
| 7,021,433 | B2 * | 4/2006 | Yamada et al. ............. 188/306 |
| 7,044,489 | B2 * | 5/2006 | Bunya et al. ............... 280/272 |
| 2004/0211632 | A1 * | 10/2004 | Yamada ...................... 188/290 |
| 2005/0017477 | A1 * | 1/2005 | Sato et al. ................... 280/272 |
| 2005/0274582 | A1 * | 12/2005 | Tomonaga ................... 188/293 |

FOREIGN PATENT DOCUMENTS

JP    2001-099208    4/2001

* cited by examiner

*Primary Examiner*—Thomas E. Lazo
(74) *Attorney, Agent, or Firm*—Hiroe & Associates; Michael L. Crapenhoft

(57) ABSTRACT

A rotary damper for damping oscillation of a motorcycle front tire includes a vane swingably mounted inside the rotary damper between left and right oil chambers, passages placing the oil chambers in fluid communication with one another, front chambers in communication with the passages to secure a pressure-receiving area adjacent the vane when the vane is at one of its extreme swing positions and begins swinging back towards the center of the damper, and grooves in fluid communication with the front chambers, wherein the grooves are formed shallower than the front chambers, and the passages are opened to the bottom of said grooves.

1 Claim, 2 Drawing Sheets

ROTARY DAMPER

BACKGROUND OF THE INVENTION

This invention relates to a rotary damper and in particular to improvements in a vane type rotary damper.

Rotary dampers are sometimes used in steering mechanisms for newer motorcycles. A rotary damper can be useful in damping front wheel oscillation while the vehicle is moving. Such a use is described, for example, in Japanese Laid Open Patent Application No. 2001-99208.

A rotary damper of the same general type as that described in the Japanese publication is depicted schematically in FIG. 2 that accompanies this specification. The damper includes a left oil chamber R1 and a right oil chamber R2, which are separated from one another by a vane 2 and located inside a housing 1. The vane 2 has an orifice 2a through it, which allows communication between the left oil chamber R1 and the right oil chamber R2 through the orifice 2a. A damping effect is generated as oil flows between the left and right orifices R1 and R2 as their relative sizes change as the vane 2 moves back and forth inside the chamber.

Reference characters 4, 5, 6, and 7 are used in the figures to indicate parts that control the flow of operating oil between the left oil chamber R1 and the right oil chamber R2 as the oil passes through a single damping valve 10 and a relief valve V via bypasses in the form of passages L1 and L2. An accumulator A is provided in communication with the passages L1 and L2 in order to control changes in the oil temperature.

In a rotary damper of the type described in the Japanese publication, the open ends of the passages L1 and L2 place the left oil chamber R1 and the right oil chamber R2 in communication while bypassing the orifice 2a. When the vane is near one of the limits of its swing motion, the open end of the passage L1 and L2 closest to the vane is exposed to only a small volume of oil in a chamber defined between the side of the vane and the peripheral wall of the housing 1 that is closest to the vane.

As a consequence, when the side of the vane 2 is very near a peripheral wall of the housing 1 (i.e., when the vane is at one of the limits of its swing) the pressure-receiving space inside the chamber is extremely small as the vane starts moving back towards the center of the chamber, and the starting of this motion may thus not be smooth.

It has thus been suggested to provide a housing 1 with a left oil chamber R1 and a right oil chamber R2 divided by a vane 2 and having a configuration as shown in FIG. 3. This configuration includes front chambers A1 and A2, which remain on either side of the vane 2 and open to the oil passages even when the vane 2 moves close to the peripheral wall 1a of the housing 1 at the vane's maximum possible swing. These positions of the vane are shown in FIG. 3 by imaginary lines.

The volumes of the pressure-receiving spaces on either side of the vane 2 can thus be increased by making the front chambers A1 and A2 as large possible, which enhances the smooth starting of the vane's swinging movement as the vane begins to move away from one of its maximum position limits.

A rotary damper of the type shown in FIG. 3 is less than ideal however, in that it requires a larger amount of operating oil than other previous types. It would be desirable to reduce the amount of required operating oil, thereby reducing the cost of the products used in the damper.

In other words, the front chambers A1 and A2 of the rotary damper shown in FIG. 3 must be made large because the passages L1 and L2 (see FIG. 2) that place the left oil chamber R1 and the right oil chamber R2 into communication with each other open into the front chambers A1 and A2. In such a configuration, the front chambers A1 and A2 are formed such that the left oil chamber R1 and the right oil chamber R2 are widened in the direction of the vane's swing.

As a result, the rotary damper shown in FIG. 3 requires more oil than the one described in the Japanese publication. It would be desirable, though, to reduce the amount of operating oil, and thereby to reduce the overall weight and cost of the product.

This document describes an improved rotary damper for damping oscillations in the front tire of a moving motorcycle. A preferred embodiment described below allows a reduction in the overall weight and cost of the product, and thereby enhances its usability and versatility.

SUMMARY OF THE INVENTION

The invention is embodied in a rotary damper that includes a vane swingably mounted inside the rotary damper, a left oil chamber and a right oil chamber separated by the vane, passages that place the left oil chamber and the right oil chamber into communication with one another, front chambers in communication with those passages and provide a pressure-receiving area when the vane is at one of its maximum swing positions and starts moving back towards its center position, and grooves in communication with the front chambers, wherein the grooves are formed shallower than the front chambers and wherein the passages are open to the bottom of the grooves.

Since the front chambers that secure a pressure-receiving area alongside the vane when the vane begins moving from its maximum swing position towards its center position communicate with the grooves, which are formed shallower than the front chambers, and the passages that provide communication between the left oil chamber and the right oil chamber on either side of the vane are opened to the bottom of the grooves, it is thereby possible to make the pressure receiving area of the vane as large as possible while forming the front chambers smaller than would otherwise be possible, and the amount of operating oil required in the front chambers can thereby be reduced.

This allows a reduction in the amount of operating oil required, which contributes to a corresponding reductions in the overall weight and cost of products used in the damper.

BRIEF DESCRIPTION OF THE DRAWINGS

The invention will be better understood by reference to the following detailed description of a preferred embodiment, along with the accompanying figures, in which.

DETAILED DESCRIPTION OF A PREFERRED EMBODIMENT

Figure 1:
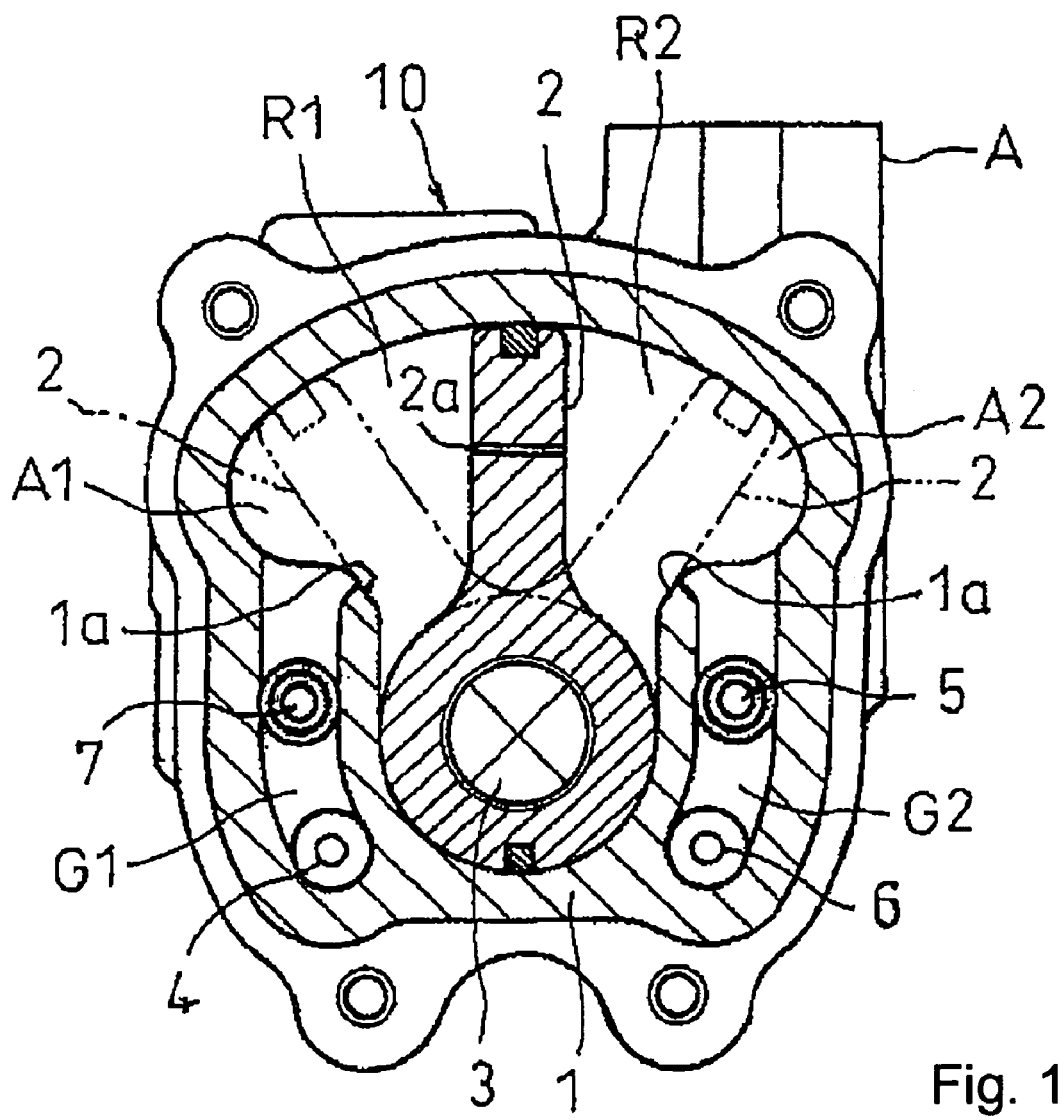
FIG. 1 is a plane cross-sectional view of a rotary damper that embodies the invention.

An embodiment of the invention is described below in connection with FIG. 1. The rotary damper depicted in that drawing and described here also uses a system like that shown in FIG. 2 and described above.

Figure 2:
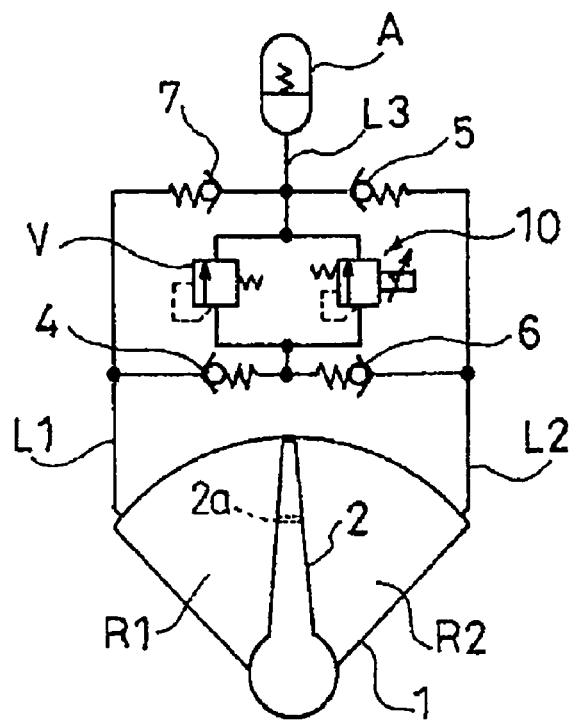
FIG. 2 is a schematic diagram of a prior rotary damper of the type described in Japanese Laid Open Patent Application No. 2001-99208.
Figure 3:
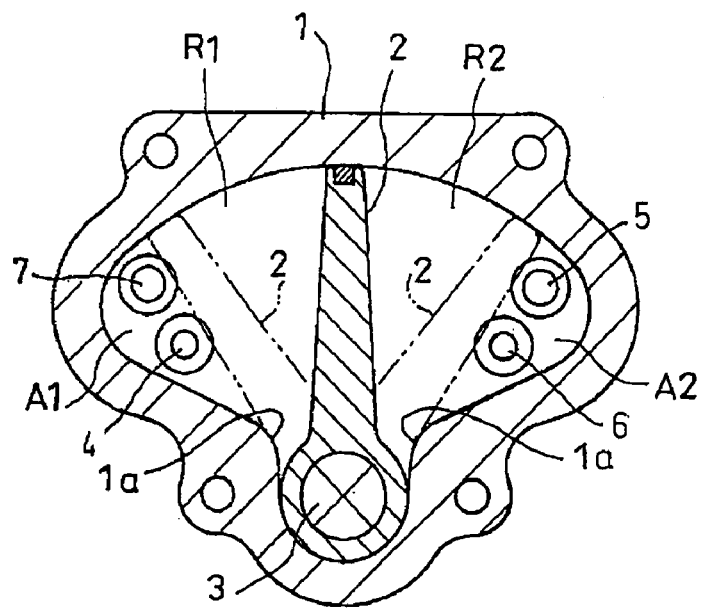
FIG. 3 is a plane cross-sectional view of a prior rotary damper.

The embodiment described here can thus be understood by referring as well to FIG. 2, and no separate illustration of the overall system's components is therefore supplied. It should be appreciated, moreover, that the rotary damper described here can be used in connection with motorcycle steering systems in the manner described in the Japanese publication referenced above.

Accordingly, a rotary damper that embodies the invention includes a left oil chamber R1 and a right oil chamber R2. These two chambers are divided by a vane 2 that is swingably mounted inside a housing 1. The rotary damper also includes passages L1 and L2 that allow operating oil to pass between the left and right oil chambers R1 and R2 as the relative sizes of the two chambers change as the vane swings back and forth inside the housing (see FIG. 2).

The housing 1 is integrally mounted on an upper bracket connected to the top ends of front forks that hold a front tire of a motorcycle (not shown). The vane 2 is pivotally attached to swing about an axis that passes through a shaft 3 that extends through the housing 1 in a liquid tight manner. The shaft 3 is connected to the body of the motorcycle through a linkage or the like (not shown).

When the upper bracket that holds the front forks moves in relation to the vehicle body, for example, when the operator moves the motorcycle's handlebars, the vane 2 moves or swings inside the housing 1 of the rotary damper, and the sizes of the left oil chamber R1 and the right oil chamber R2, which are divided by the vane 2 inside the housing 1, thus increase or decrease depending on which way the vane moves.

When a damping valve 10 (see FIG. 2) is mounted between the passages L1 and L2 that communicated with the left oil chamber R1 and the right oil chamber R2, the sizes of which change with movement of the vane, a predetermined damping effect is generated as operating oil passes through the attenuating valve.

Where a relief valve V (see FIG. 2) is provided in the passages L1 and L2 for bypassing the damping valve 10, the relieve valve V allows the vane 2 to swing at a high speed. Where the passages L1 and L2 communicate with an accumulator A (see FIG. 2) to provide an oil-temperature compensation mechanism, abnormally high pressures can be avoided in the left chamber R1 and the right chamber R2.

Damping can be generated, in addition to the predetermined damping effect provided by the valve 10, by an orifice 2a that allows communication between the left oil chamber R1 and the right oil chamber R2 through the vane 2. Damping is generated by the flow of operating oil through the orifice 2a as the vane swings between the two oil chambers.

The damping valve 10 mounted in the passages L1 and L2 may also be made adjustable so that the strength of the damping effect can be adjusted by external manipulation. Such a configuration may generate damping through the flow of oil through gaps.

In this embodiment of the rotary damper, the left oil chamber R1 and the right oil chamber R2 are divided by the vane 2, which is swingably mounted inside the housing 1. When the vane 2 moves near one of the peripheral walls 1a inside the housing at one of the vane's maximum swing points (shown using imaginary lines in FIG. 1) the front chambers are divided by the vane 2 such that either the left oil chamber R1 or the right oil chamber R2 is widened in the direction of the vane's swing.

The presence of the front chambers A1 and A2 makes it possible to make the pressure-receiving area as large as possible, which enhances the smoothness of the vane's motion as the vane 2 reverses itself from its maximum swing position and starts moving back in the opposite direction.

On the other hand, in this rotary damper the front chambers A1 and A2 communicate with grooves G1 and G2, which are formed shallower than the front chambers A1 and A2. The passages L1 and L2, which provide communication between the left oil chamber R1 and the right oil chamber R2 open into the bottoms of the grooves G1 and G2.

While communication is provided between the passages L1 and L2 and the front chambers A1 and A2 by opening the passages L1 and L2 at the bottoms of the grooves G1 and G2, the grooves G1 and G2 are formed shallower than the front chambers A1 and A2. The areas of the front chambers A1 and A2 can thus be made smaller in comparison with the case in which the passages L1 and L2 are opened directly to the bottoms of the front chambers A1 and A2, and the amounts of operating oil held in the front chambers A1 and A2 can thereby be reduced.

As a result, the rotary damper described here can reduce the amount of operating oil required, which contributes to the reduction of the overall weight and the overall cost of the product.

Reducing the amount of operating oil in the rotary damper also allows a reduction in size of the accumulator that is used to control changes in the oil temperature. This further contributes to the reductions in the overall weight, size, and cost of the product.

The rotary damper described above is useful as a part of a steering system for motorcycles. It should also be appreciated that such a damper may be used in a steering mechanism for bicycles as well.

What is claimed is:

1. A rotary damper comprising:
   a vane swingably mounted in said rotary damper;
   a left oil chamber and a right oil chamber separated by said vane;
   passages placing said left oil chamber and right oil chamber in fluid communication with one another;
   front chambers in fluid communication with said passages and providing a pressure-receiving area at the time that said vane at its maximum swing state starts swinging back; and
   grooves in fluid communication with said front chambers;
   wherein said grooves are formed shallower than said front chambers, and said passages are opened to the bottom of said grooves.

* * * * *